United States Patent Office 2,938,851
Patented May 31, 1960

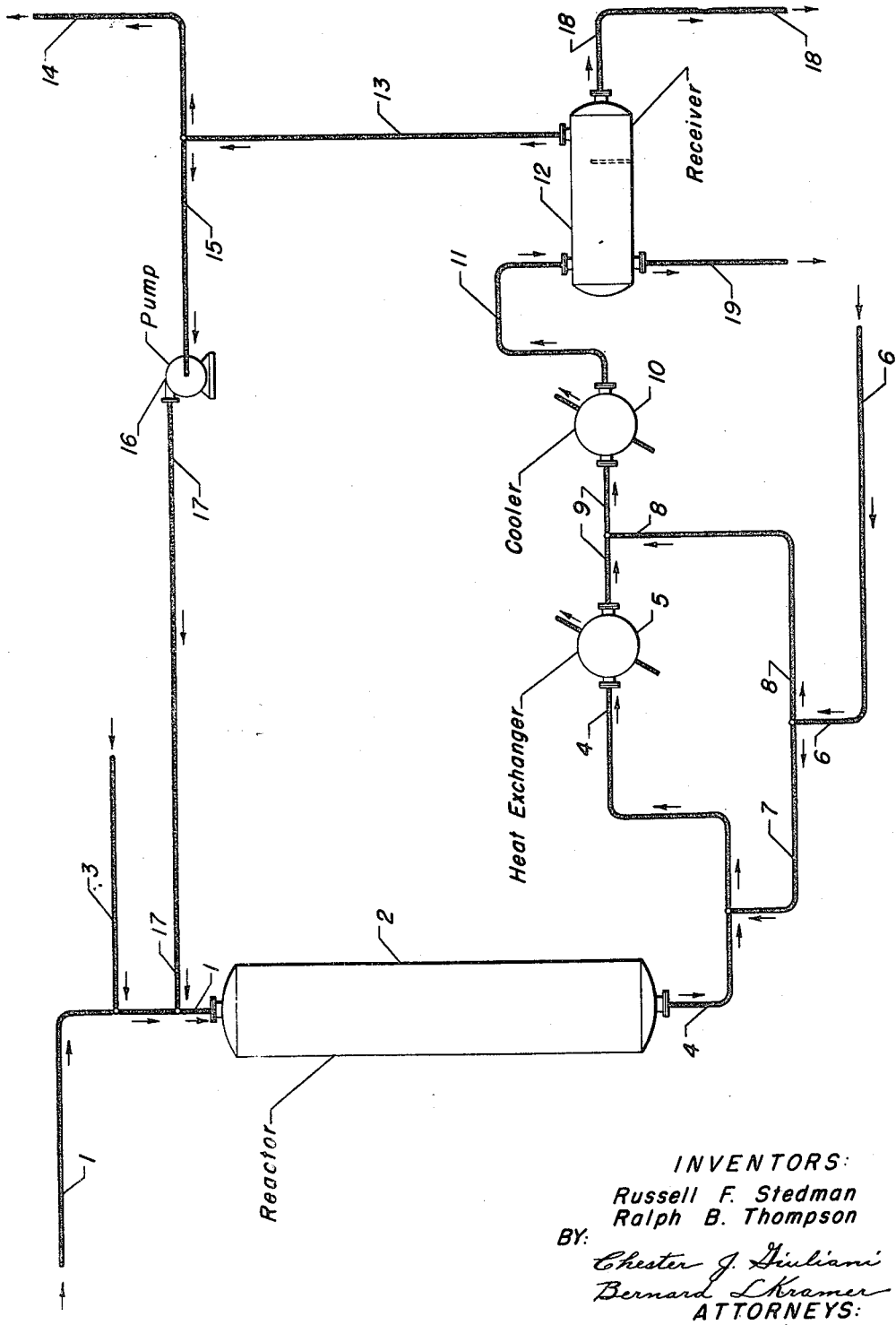
INVENTORS:
Russell F. Stedman
Ralph B. Thompson
BY:
Chester J. Giuliani
Bernard L. Kramer
ATTORNEYS:

2,938,851

PREVENTING CORROSION OF PLANT EQUIPMENT

Russell F. Stedman, Des Plaines, and Ralph B. Thompson, Hinsdale, Ill., assignors, by mesne assignments, to Universal Oil Products Company, Des Plaines, Ill., a corporation of Delaware Filed Feb. 10, 1956, Ser. No. 564,840

9 Claims. (Cl. 208—47)

This invention relates to a novel method of preventing corrosion of plant equipment in a process wherein a corrosive acidic component is present in the reactor effluent products. Generally the acidic component either is introduced to the process for a definite purpose or is contained in the charge to the process.

For example in the reforming of gasoline fractions in the presence of a platinum-containing catalyst, it has been found that the introduction of a chloride in small amounts along with the charge is of advantage in promoting certain desired reactions. When the charging stock contains the chlorides or other acidic components in sufficient concentration, it is unnecessary to introduce additional chloride from an extraneous source. In any event, the hot effluent products from the reforming reactor contain these chlorides or other acidic components which, upon cooling of the effluent products, are very corrosive. This results in excessive corrosion of the heat exchangers or coolers and of the plant equipment through which the effluent products subsequently pass.

While the present invention is particularly applicable for use in reforming processes utilizing the platinum-containing catalyst, it is understood that the novel features of the present invention may be utilized in any process in which the effluent products contain corrosive acidic components and in which it is desired to recycle a gaseous stream.

In one embodiment the present invention relates to a method of reducing corrosion of plant equipment in a process wherein hot effluent reactor products contain a corrosive acidic component and wherein a gaseous stream separated from liquid effluent products is recycled to said reactor, which comprises admixing an organic amino compound with hot effluent products, thereafter cooling the same, separating therefrom a gaseous stream substantially free of said organic amino compound, and recycling said gaseous stream to said reactor.

In a specific embodiment the present invention relates to a method of reducing corrosion of plant equipment in a reforming process utilizing a platinum-containing catalyst, wherein hot effluent reactor products contain a corrosive chloride compound and wherein a hydrogen stream separated from said effluent products is recycled to said reactor, which comprises partly cooling said effluent products, admixing ethylene diamine and water with said partly cooled effluent products, thereafter further cooling the same, separating therefrom a hydrogen stream substantially free of said ethylene diamine, recycling said hydrogen stream to said reactor, and separately withdrawing liquid effluent products and a water fraction containing ethylene diamine hydrochloride.

The reforming reactions are effected in the presence of hydrogen and, for economical reasons, it is necessary to separate a hydrogen stream from the effluent products and to recycle the hydrogen back to the reforming reactor. In general, amino compounds tend to affect detrimentally the reforming catalyst and should not be recycled with the hydrogen. For this reason, ammonia is not satisfactory because of its high volatility. In the separation of the hydrogen from the liquid effluent products, the ammonia is liberated along with the hydrogen and is recycled to the reactor. On the other hand, the organic amino compound used in the present invention is of sufficiently low volatility that it will be retained in the liquid phase and will not be recycled to the reforming reactor.

The invention is more fully described with reference to the accompanying diagrammatic flow drawing which illustrates one specific embodiment thereof but is not intended to unduly limit the invention thereto.

In the interest of simplicity, the description of the drawing will be directed to a reforming process in which a gasoline fraction is subjected to reforming in the presence of a catalyst containing platinum. The gasoline fraction may be a full boiling gasoline and thus may have an initial boiling point within the range of from about 70° to about 120° F. and an end boiling point within the range of from about 375° to about 450° F., or it may be any selected fraction thereof and particularly a naphtha fraction having an initial boiling point within the range of from about 150° to about 300° F. and an end boiling point within the range of from about 350° to about 450° F. It is understood that the charge in other processes may comprise higher boiling fractions including kerosene, gas oil, diesel fuel, stove oil, etc., or mixtures thereof, or mixtures thereof with gasoline fractions.

A preferred catalyst for reforming of gasoline fractions comprises a composite of alumina, platinum and combined halogen, the platinum being in a concentration of from about 0.02% to about 2% by weight and the halogen being in a concentration of from about 0.2% to about 5% by weight. The halogen may comprise a mixture of two halogens, particularly fluoride and chloride. Other platinum-containing catalysts include composites of alumina and platinum, alumina, silica and platinum, etc. The reforming process generally is effected at a temperature within the range of from about 800° to about 1000° F. and a pressure of from about 100 to about 1000 p.s.i. or more. As hereinbefore set forth, the reforming reaction preferably is effected in the presence of hydrogen, which generally will be present in a mol ratio to hydrocarbon of from about 0.2 to about 20.

Referring to the drawing, the charge, at a suitable temperature and pressure, is introduced to the process through line 1 and is commingled with hydrogen being recycled within the process in the manner to be hereinafter described. The mixture is introduced into reactor 2, although it is understood that the charge and hydrogen may be introduced separately and that they may be heated separately when desired. Reactor 2 preferably contains a fixed bed of catalyst disposed therein and either upward or downward flow may be employed. It is understood that the process may be effected by utilizing a moving bed of catalyst, which catalyst moved as a bed either concurrently or countercurrently to the charge, a fluidized catalyst system in which the catalyst and reactants are maintained in a state of turbulence under hindered settling conditions, a fluidized fixed bed system which utilizes the fluidized principle but the catalyst is now withdrawn from the reactor, or a slurry type operation in which the catalyst is carried into the reactor by all or a portion of the charge.

As hereinbefore set forth, in some cases the charging stock contains acidic components, particularly chlorides, or these are introduced into the process in order to promote certain reactions desirable in reforming. When so desired, the chloride, either as hydrogen chloride, but preferably as an alkyl chloride such as tertiary butyl chloride or a poly chloride such as propylene dichloride, may be introduced into the reactor by way of lines 3 and 1.

Regardless of the specific method in which the reaction is effected in zone 2 or whether the chlorides or other acidic components are introduced extraneously or are contained in the charge, the effluent products are withdrawn from reactor 2 by way of line 4 and are partly cooled in exchanger 5. Any suitable medium may be utilized in exchanger 5 to partly cool the effluent products, a particularly preferred arrangement comprising utilizing the charge to the process for this purpose.

In accordance with the present invention, an organic amino compound is commingled with the effluent products from reactor 2. While the organic amino compound may be introduced ahead of exchanger 5 by being directed through lines 6 and 7 into line 4, preferably the organic amino compound is introduced after exchanger 5 by being directed through lines 6 and 8 into line 9. Generally little or no corrosion will occur in exchanger 5 because of the high temperature of the effluent products, which generally will enter the exchanger at a temperature within the range of about 700° to 900° F., and are cooled therein to a temperature in the range of from about 500° to about 700° F. Corrosion problems occur when the effluent products are cooled to a temperature below about 400° F., which cooling is effected in cooler 10. For this, it is preferable to introduce the organic amino compound between exchanger 5 and cooler 10. Water also is introduced and may be introduced in commingled state with the organic amino compound or it may be introduced separately and either before but preferably after heat exchanger 5.

As hereinbefore set forth, the effluent products are cooled in exchanger 10 to a temperature below about 400° F. and as low as about 100° F. or even lower in some cases. Usually water is used as the cooling medium in cooler 10 but any other suitable liquid may be used for this purpose. The cooled products are passed through line 11 to receiver 12.

Any suitable organic amino compound may be used in accordance with the present invention. As hereinbefore set forth, it is essential that the organic amino compound is water-soluble and also is of sufficiently low volatility that it will not be carried with the hydrogen stream being recycled. Particularly suitable organic amino compounds comprise ethylene diamine and diethylene triamine. Other alkylene polyamines include propylene diamine, trimethylene diamine, tetramethylene diamine, pentamethylene diamine, hexamethylene diamine, triethylene tetramine, tetraethylene pentamine, pentaethylene hexamine, etc., or mixtures thereof, as well as primary alkyl amines such as butyl amine, amyl amine, hexyl amine, heptyl amine, octyl amine, etc. Also useful as the organic amino compound are alkanol amines including ethanol amine, diethanol amine, triethanol amine, etc. It is understood that mixtures of amines and/or alkanol amines may be employed.

In receiver 12, the cooled effluent products are separated into a hydrogen stream, a hydrocarbon phase and a water phase. The hydrogen stream is withdrawn from receiver 12 by way of line 13 and, while all or a portion may be removed from the process by way of line 14, at least a portion of the hydrogen is recycled by way of line 15, compressor 16 and line 17 to be passed by way of line 1 to reactor 2. The hydrocarbon phase is withdrawn from receiver 12 through line 18. The water phase is withdrawn from receiver 12 through line 19 and, as hereinbefore set forth, it will contain the organic amino compound and the acidic component. Generally the acidic component reacts with the organic amino compound to form a definite compound which is water-soluble and is removed with the water phase. For example, hydrogen chloride reacts with ethylene diamine to form the hydrochloride, and the hydrochloride is withdrawn through line 19 from receiver 12. As hereinbefore set forth, the organic amino compound will not be recycled through line 13 with the hydrogen stream and, therefore, will not be carried into reactor 2 to affect deleteriously the reforming catalyst.

The amount of organic amino compound to be employed will depend upon the concentration of acidic components in the effluent product. In general, it will be necessary to use the organic amino compound only in stoichiometric amounts based upon the reactive amino groups to the acidic and particularly chloride components in the effluent product. However, in some cases, a slight excess of amino compound may be preferred in order to insure complete removal of acidic components from the effluent product. As a typical illustration, in a reforming process charging 1000 barrels per day of gasoline fraction, the organic amino compound will be used in a concentration of about 3 gallons per day and will be introduced, either continuously or intermittently as an aqueous solution, into line 9. Sufficient water is utilized in order to form a definite aqueous phase in receiver 12 and in order to insure complete removal of the amino and acidic compounds.

In the interest of simplicity, heaters, valves, pumps and similar appurtenances have been omitted from the drawing, with the understanding that these will be provided as necessary.

We claim as our invention:

1. A method of reducing corrosion of plant equipment in a process wherein hot effluent reactor products contain a corrosive acidic component and wherein a gaseous stream separated from liquid effluent products is recycled to said reactor, which comprises admixing a water-soluble organic amino compound and water with hot effluent products while the latter are at a temperature above 400° F., thereafter cooling the effluent products to below 400° F., separating a gaseous stream substantially free of said organic amino compound from an aqueous phase containing the amino compound and said acidic component, and recycling said gaseous stream to said reactor.

2. A method of reducing corrosion of plant equipment in a process wherein hot effluent reactor products contain a corrosive acidic component and wherein a gaseous stream separated from liquid effluent products is recycled to said reactor, which comprises partly cooling said effluent products to a temperature of from about 500° F. to about 700° F., admixing a water-soluble organic amino compound and water with said partly cooled effluent products, thereafter further cooling the effluent products to below 400° F., separating a gaseous stream substantially free of said corrosive acidic component and said organic amino compound from an aqueous phase containing the amino compound and said acidic component, and recycling said gaseous stream to said reactor.

3. A method of reducing corrosion of plant equipment in a reforming process utilizing a platinum-containing catalyst, wherein hot effluent reactor products contain a corrosive chloride compound and wherein a hydrogen stream separated from said effluent products is recycled to said reactor, which comprises partly cooling said effluent products to a temperature of from about 500° F. to about 700° F., admixing an alkylene polyamine and water with said partly cooled effluent products, thereafter further cooling the effluent products to below 400° F., separating therefrom a hydrogen stream substantially free of said alkylene polyamine, recycling said hydrogen stream to said reactor, and separately withdrawing liquid effluent products and a water fraction containing an alkalene polyamine hydrochloride.

4. A method of reducing corrosion of plant equipment in a reforming process utilizing a platinum-containing catalyst, wherein hot effluent reactor products contain a corrosive chloride compound and wherein a hydrogen stream separated from said effluent products is recycled to said reactor, which comprises partly cooling said effluent products to a temperature of from about 500° F. to about 700° F., admixing ethylene diamine and water with said partly cooled effluent products, thereafter further cooling the effluent products to below 400° F., separating therefrom a hydrogen stream substantially free of said ethylene diamine, recycling said hydrogen stream to said reactor, and separately withdrawing liquid effluent products and a water fraction containing ethylene diamine hydrochloride.

5. A method of reducing corrosion of plant equipment in a reforming process utilizing a platinum-containing catalyst, wherein hot effluent reactor products contain a corrosive chloride compound and wherein a hydrogen stream separated from said effluent products is recycled to said reactor, which comprises partly cooling said effluent products to a temperature of from about 500° F. to about 700° F., admixing diethylene triamine and water with said partly cooled effluent products, thereafter further cooling the effluent products to below 400° F., separating therefrom a hydrogen stream substantially free of said diethylene triamine, recycling said hydrogen stream to said reactor, and separately withdrawing liquid effluent products and a water fraction containing diethylene triamine hydrochloride.

6. A method of reducing corrosion of plant equipment in a reforming process utilizing a platinum-containing catalyst, wherein hot effluent reactor products contain a corrosive chloride compound and wherein a hydrogen stream separated from said effluent products is recycled to said reactor, which comprises partly cooling said effluent products to a temperature of from about 500° F. to about 700° F., admixing triethylene tetramine and water with said partly cooled effluent products, thereafter further cooling the effluent products to below 400° F., separating therefrom a hydrogen stream substantially free of said triethylene tetramine, recycling said hydrogen stream to said reactor, and separately withdrawing liquid effluent products and a water fraction containing triethylene tetramine hydrochloride.

7. A method of reducing corrosion of plant equipment in a reforming process utilizing a platinum-containing catalyst, wherein hot effluent reactor products contain a corrosive chloride compound and wherein a hydrogen stream separated from said effluent products is recycled to said reactor, which comprises partly cooling said effluent products to a temperature of from about 500° F. to about 700° F., admixing tetraethylene pentamine and water with said partly cooled effluent products, thereafter further cooling the effluent products to below 400° F., separating therefrom a hydrogen stream substantially free of said tetraethylene pentamine, recycling said hydrogen stream to said reactor, and separately withdrawing liquid effluent products and a water fraction containing tetraethylene pentamine hydrochloride.

8. A method of reducing corrosion of plant equipment in a reforming process utilizing a platinum-containing catalyst, wherein hot effluent reactor products contain a corrosive chloride compound and wherein a hydrogen stream separated from said effluent products is recycled to said reactor, which comprises partly cooling said effluent products to a temperature of from about 500° F. to about 700° F., admixing an alkanol amine and water with said partly cooled effluent products, thereafter further cooling the effluent products to below 400° F., separating therefrom a hydrogen stream substantially free of said alkanol amine, recycling said hydrogen stream to said reactor, and separately withdrawing liquid effluent products and a water fraction containing an alkanol amine hydrochloride.

9. A method of reducing corrosion of plant equipment, in a reforming process utilizing a platinum-containing catalyst, wherein hot effluent reactor products contain a corrosive chloride compound and wherein a hydrogen stream separated from said effluent products is recycled to said reactor, which comprises partly cooling said effluent products to a temperature of from about 500° F. to about 700° F., admixing diethanol amine and water with said partly cooled effluent products, thereafter further cooling the effluent products to below 400° F., separating therefrom a hydrogen stream substantially free of said diethanol amine, recycling said hydrogen stream to said reactor, and separately withdrawing liquid effluent products and a water fraction containing diethanol amine hydrochloride.

References Cited in the file of this patent

UNITED STATES PATENTS

| | | |
|---|---|---|
| 2,460,259 | Kahler | Jan. 25, 1949 |
| 2,573,149 | Kassel | Oct. 30, 1951 |
| 2,642,384 | Cox | June 16, 1953 |
| 2,752,289 | Haensel | June 26, 1956 |

FOREIGN PATENTS

| | | |
|---|---|---|
| 447,210 | Great Britain | May 14, 1936 |